INVENTOR:
ROBERT C. CLARK,
BY Joseph P. Kates
HIS ATTORNEY.

INVENTOR:
ROBERT C. CLARK,
BY Joseph P. Kates
HIS ATTORNEY.

3,134,961
CODE SELECTOR
Robert C. Clark, Liverpool, N.Y., assignor to General Electric Company, a corporation of New York
Filed Nov. 26, 1958, Ser. No. 776,602
9 Claims. (Cl. 340—164)

Figure 1:
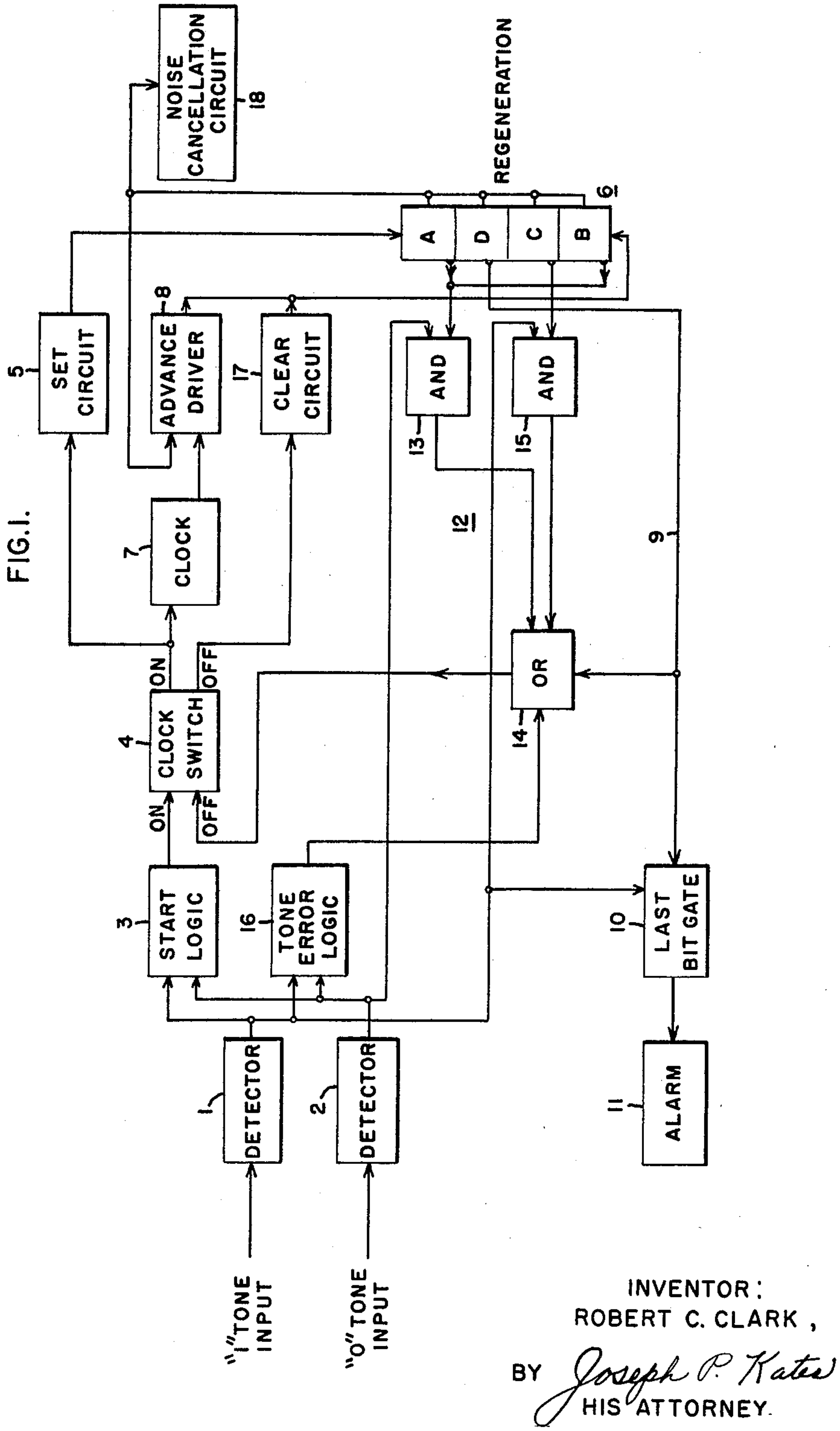

This invention relates to code selectors, and more particularly two-tone code selectors which may be used in a selective calling system.

Various systems have heretofore been proposed in the prior art for paging doctors or other persons who move from place to place and who otherwise could not be contacted. Some of these systems have utilized code selectors which are actuated in response to a binary code. For example, my application Serial No. 765,423, filed October 6, 1958, discloses a code selector which is actuated in response to a binary code consisting of the presence or absence of a given input condition, commonly referred to as the "1" state and the "0" state. Such code selectors may, under certain circumstance be subject to fase operation due to faulty transmission of the binary code which actuates the selector. For example, a bit consisting of the presence of a given input condition may be lost in transmission so that the code selector receives a binary "0" instead of the intended binary "1." This will prevent the code selector from being actuated in response to the desired code and may cause another code selector to be actuated in response to an incorrect code. Similarly, noise present in the transmission of the code may cause the code selector to receive a binary "1" when the transmitted bit should be a binary "0."

The code selectors of the subject invention overcome this disadvantage by utilizing a two-tone code to transmit information to the code selectors. The reliability of a binary code is improved considerably by using one tone to represent the "1" state and another tone to represent the "0" state as is done in the subject invention.

It is accordingly the object of this invention to provide an improved code selector for a selector calling communication system.

Another object of this invention is the provision of an improved code selector which will actuate an alarm in response to a two-tone binary code.

Another object of this invention is the provision of a code selector of improved reliability.

Still another object of this invention is the provision of a code selector which will not only sample the code to determine if the received code is the code which the selector is designed to recognize but also will compare the input conditions to determined errors in the transmission of the code.

In one form of my invention, binary codes, each identifying a particular selector, are received by all selectors. The first bit of each code received by the selectors is a start bit which enables a clock circuit in each selector to drive a ring counter through its cycle. This ring counter has a number of stages, each of which corresponds to one bit of the received code. As the ring counter is driven through its cycle, gating circuitry compares the output of each stage of the ring counter with the corresponding bit of the received code. If there is a coincidence between the binary code which the selector is designed to recognize and the incoming binary code, an alarm is actuated at the end of the ring counter cycle.

However, if the gating circuitry detects a difference between any bit of the received code and the corresponding bit of the code which the selector is designed to recognize, the gating circuitry will disable the clock circuit from feeding pulses to the ring counter.

Tone error logic circuitry is also provided for detecting an error in the transmission of the code. If the tone error logic circuitry has detected an error in the received code, the clock circuit will be disabled from feeding pulses to the ring counter.

Thus, whenever there has been an error in the transmission of the code or whenever one of the bits of the received code differs from the corresponding bit of code which the selector is designed to recognize, the ring counter will not be driven through one complete cycle and the alarm will not be actuated.

Referring particularly to FIG. 1, there is shown a block diagram of a two-tone code selector which is designed to recognize the code 1101. The "1" tone input and the "0" tone input are fed into detectors 1 and 2, respectively. These detectors convert the incoming tone into D.C. voltages. The outputs of the detectors are fed to start logic 3 which will turn on a clock switch 4 in response to the reception of a correct start bit. The clock switch 4 will enable a set circuit 5 to a set a binary "1" into the first stage, A, of a ring counter 6. The clock switch 4 will also enable the clock 7 and advance driver 8 to feed clock pulses to the ring counter 6. These clock pulses will drive the binary "1" from the first stage to succeeding stages of the ring counter 6.

The ring counter shown consists of four magnetic core storage elements A, B, C and D. When the binary "1" is driven from the last stage, D, of the ring counter a pulse will be transferred over a trip line 9 to a last bit gate 10. The other input to the last bit gate is the output from one or the other of the detectors, depending on the nature of the last bit of the code, i.e., whether it is "1" or "0." If the last bit of the code which the selector is designed to recognize is a "1," as in the subject embodiment, the detector 1 is connected to the last bit gate 10. In this case, the last bit gate 10 will pass the pulse from the trip line 9 to an alarm 11 only if the last bit in the received code is a "1." Actuation of this alarm indicates that the particular code which the selector has been designed to recognize has been received.

Gating circuitry 12 including AND circuits 13 and 15 and OR circuit 14, is connected to the selected stages of the ring counter and to the detector outputs to determine if the proper binary code has been received. The particular connection of the ring counter to the gating circuitry depends on the code which the selector is designed to recognize. For example, if the selector is adapted to recognize the code 1101, the outputs of stages A and B of the ring counter are connected to the AND circuit 13. The "0" tone input from detector 2 is also connected to AND circuit 13. The output of stage C of the ring counter is connected to AND circuit 15. The outputs of AND circuits 13 and 15 are connected to OR circuit 14.

In order to determine if there has been an error in the transmission of the code the "1" tone input and the "0" tone input from detectors 1 and 2 are connected directly to the tone error logic circuitry 16. The tone error logic circuitry will produce an output when both the "1" tone input and the "0" tone input are in the ON condition or when both inputs are in the OFF condition. The output of tone error logic circuitry 16 is connected through the OR circuit 14 to the OFF input of the clock switch 4 so that an output pulse from the tone error logic circuitry 16 will turn OFF the clock switch, thus disabling the clock circuitry 7. When the clock circuitry is disabled before the ring counter has been driven through a complete cycle, the alarm will not be actuated.

The OFF output of clock switch 4 is connected to the clear circuit 17. When the clear circuit 17 is enabled by the OFF condition of the clock switch 4, the clear circuit will drive all cores of the ring counter 6 to the "0" position.

The noise cancellation circuit 18 cancels the noise which is present on the output windings of a magnetic core ring counter of the type used. The operation of this noise cancellation circuit is described in detail in the application of R. F. Suits and R. P. Gifford, Serial No. 762,440, filed September 22, 1958.

Before attempting a detailed description of the operation of the code selector, each of the circuits shown in block form in FIG. 1 will be described in detail.

Figure 2:
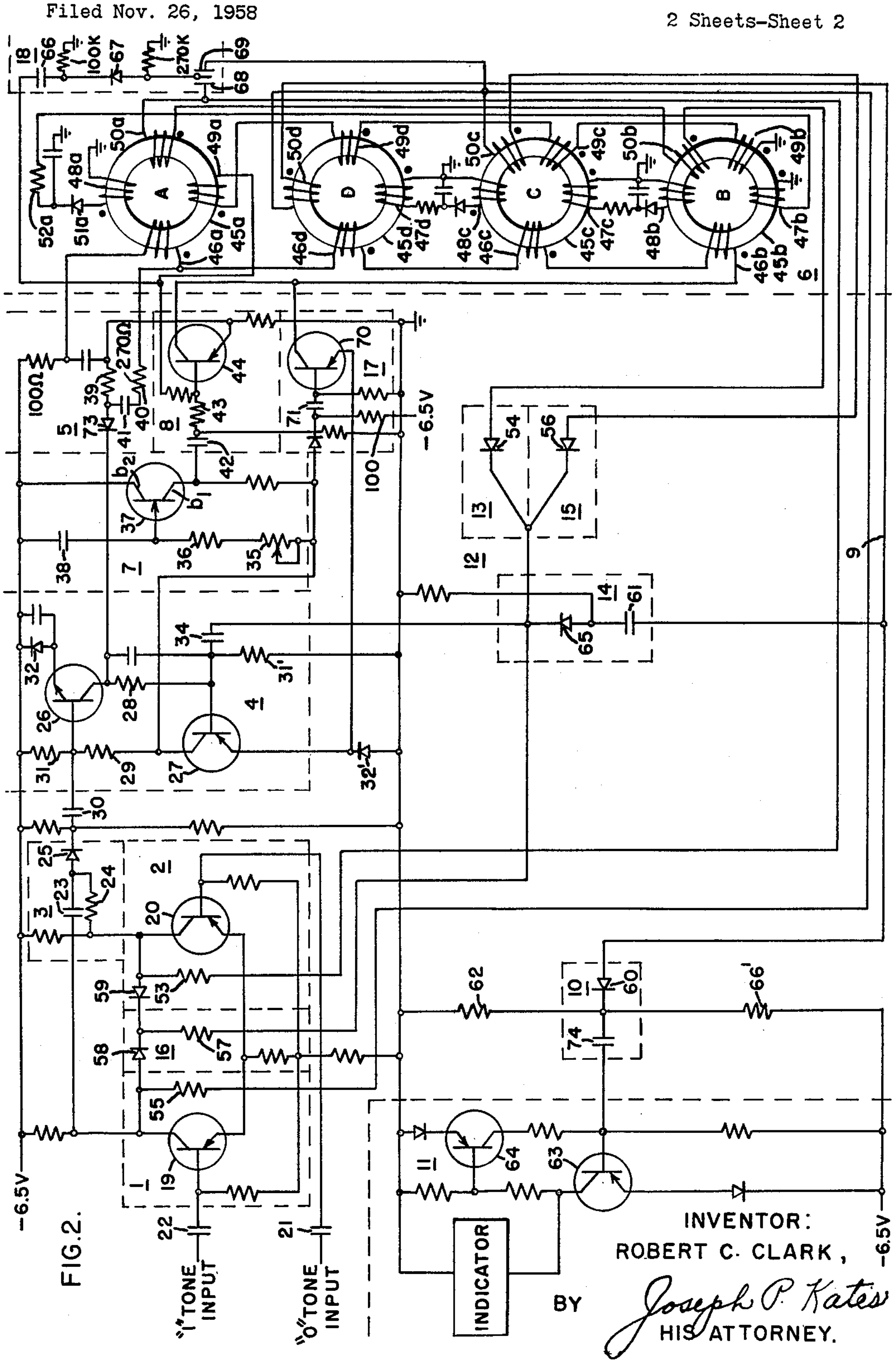

Referring particularly to FIG. 2, the detectors 1 and 2 are formed by the transistors 19 and 20 respectively. The "0" tone input is coupled by a capacitor 21 to the base of transistor 20. If the "0" tone input is ON, the transistor 20 will be turned ON and the collector of transistor 20 will approach 0 v. The "1" tone input is coupled to the base of transistor 19 by a capacitor 22. If the "1" tone input is ON, the transistor 19 will be turned ON and the collector of transistor 19 will approach 0 v.

The start logic 3 is formed by a capacitor 23, a resistor 24 and a diode 25. The collector of transistor 19 is connected to one side of the capacitor 23. The other side of capacitor 23 is connected to the anode of the diode 25. The resistor 24 is connected to the collector of transistor 20 and to the anode of the diode 25. The start logic will pass a positive pulse through the diode 25 when the correct bit is received. Prior to the reception of a start bit both tone inputs are OFF and the selector is in the idle state. The start bit consists of first a "0" tone input and then a "1" tone input. The "0" tone input turns on the transistor 20 and the collector voltage is raised toward 0 v. The "1" tone input turns on the transistor 19. The positive going voltage on the collector of transistor 19 is differentiated and passes through the capacitor 23. Since the transistor 20 has already been turned on so as to raise the anode voltage of the diode 25 toward 0 v., the positive pulse which passes through capacitor 23 will also pass through the diode 25.

The positive pulse from the start logic is transferred to the clock switch 4 and more particularly to the base of transistor 26 which, together with transistor 27 and associated circuitry, forms the clock switch 4. The collector of transistor 26 is connected to the base of transistor 27 through a resistor 28. The base of transistor 26 and the base of transistor 27 are connected to —6.5 volts and 0 v. respectively through biasing resistors 31 and 31'. The emitter of transistor 26 is connected to —6.5 through a diode 32 and the emitter of transistor 27 is connected to 0 volts through a diode 32'. A positive pulse from the start logic to the base of transistor 26 will turn that transistor ON. The negative going voltage on the collector of transistor 26 is connected to the base of transistor 27 through a resistor 28 and will turn that transistor ON. The positive going voltage on the collector of transistor 27 is connected back to the base of transistor 26 through a resistor 29 to turn that transistor ON more fully and lock both transistors in the ON condition. The clock switch 4 will remain ON until a positive pulse is transferred from OR circuit 14 through a capacitor 34 to the base of transistor 27 to turn the transistor 27 OFF. The biasing resistors 31 and 31' will hold both transistors 26 and 27 OFF until the occurrence of another pulse from the start logic.

The ON output of clock switch 4, taken from the collector of transistor 26, is connected to the set circuit 5. When the clock switch 4 is switched ON, the negative voltage appearing at the collector of transistor 26 will cause the set circuit 5 to apply a negative pulse to the first stage, A, of the ring counter so as to set the first stage to the "1" condition. The set circuit comprises resistors 39 and 40 and a capacitor 41 is connected to the collector of transistor 26 through an isolation diode 73. The other side of capacitor 41 is connected through the resistor 40 to one of the windings of the first stage of the ring counter 6 so that the negative pulse from the set circuit 5 will drive this stage to the "1" position.

The ON output of the clock switch 4, taken from the collector of transistor 27, is also connected to the clock 7, and more particularly, the emitter of the transistor 37, through resistors 35 and 36. The clock 7 is formed by a transistor 37 of the double base diode type and associated circuitry. A charging capacitor 38 is connected between the emitter of transistor 37 and —6.5 v. When enabled by the clock switch 4, the clock 7 will oscillate to produce periodic negative clock pulses. When the clock switch 4 is in the OFF condition, the —6.5 volts on the collector of transistor 27, which is connected to the emitter of transistor 37, prevents the clock from oscillating. In this condition, the clock circuitry 7 is disabled. However, when the clock switch is turned ON, the collector of transistor 27 will be switched to 0 v. The capacitor 38 will charge towards 0 v. until the potential at the emitter of transistor 37 reaches a point at which transistor 37 will conduct. When transistor 37 conducts, the capacitor 38 will be discharged and a negative pulse will appear at the base $b_1$. After discharge of the capacitor 38, the transistor 37 will again be cut off until the capacitor 38 again becomes charged to the potential at which transistor 37 will conduct.

Each time the transistor 37 conducts, a negative clock pulse appears at the base $b_1$ of transistor 37. This negative pulse is coupled through a capacitor 42 and a resistor 43 to the advance driver 8 and more particularly to the base of transistor 44 which, together with associated circuitry, forms the advance driver 8. The negative pulse at the base of transistor 44 will allow the transistor to conduct. Each time the transistor 44 conducts, a positive pulse will be fed from the collector of the transistor to a magnetic core ring counter 6.

The ring counter 6 is of a type well-known in the prior art. This ring counter, in the form illustrated, comprises four bi-stable magnetic storage elements (shown as) A, B, C and D in FIG. 2. These correspond to the stages A, B, C and D shown in FIG. 1. The storage element A consists of the core **45*a*, having wound thereon an advance winding 46*a*, a drive winding 48*a*, a regenerative winding 49*a*, and an output winding 50*a*. The storage elements B, C and D have corresponding components and additionally have shift windings 47*b*, 47*c* and 47*d*** respectively wound thereon. The same numerals are employed for the components of these storage elements, the suffixes *b*, *c* and *d*, respectively, being added. In the ring counter used in this embodiment the drive winding is omitted from stage D because it is not necessary to complete the ring as is common in most ring counters.

The advance windings **46*a*, 46*b*, 46*c* and 46*d* are connected in series with one end being connected to —6.5 v. and the other end being connected to the advance driver 8 and the clear circuit 17. The regenerative windings 49*a*, 49*b*, 49*c* and 49*d* are connected in series with one end being connected to 0 v. and the other end being connected to the base of transistor 44 to provide regenerative feedback to the advance driver 8. One end of the drive winding 48*a* is connected through a diode 51*a*, and a resistor 52*a*** to one end of the shift winding 47b. Similarly, the drive winding of each stage is connected to the shift winding of the next successive stage.

The operation of the ring counter, exclusive of the connections of the output windings, can be described briefly as follows. Clock pulses from the advance driver 8 are applied to the series connected advance windings to drive the cores toward the "0" position. Before the clock pulses are applied to the advance windings, the first magnetic core 45a has been set to the "1" position by the set circuit 5. The first clock pulse will tend to drive this core back to the "0" position and at the same time a positive pulse will be induced in the drive winding 48a. This positive pulse will be transferred by the diode 51a and the resistor 52a to the shift winding 47b of the magnetic core 45b with a polarity such that the magnetic core 45b will be driven to the "1" position. Similarly, the next clock pulse through the advance windings will drive the magnetic core 45b back to the "0" position while at the same time shifting the "1" to the third magnetic core 45c. Each clock pulse will transfer the binary "1" to the next succeeding magnetic storage element.

When the "1" is driven from the last stage, D, a positive pulse will be transferred from the output winding 50d over the trip line 9 to the last bit gate 10. This pulse will also be transferred to the OR circuit 14. When the "1" is driven from the last stage of the ring counter, the ring counter has been driven through one complete cycle.

The connections from the output windings, to each other and to the detectors 1 and 2 and the AND circuits 13 and 15, are determined by the particular code which the selector is designed to recognize.

Since the first two bits in the code 1101 which the selector of this example has been designed to recognize are "1's," the output windings 50a and 50b are connected in series with one end being connected to the detector 2 and more specifically to the collector of transistor 20 through a resistor 53. The other end of the series-connected windings is connected to the anode of a diode 54 which forms the AND circuit 13. Since the third bit of the code 1101 is a "0," one end of the output winding 50c is connected to the linear detector 1 and more specifically to the collector of transistor 19 through a resistor 55. The other end of the output winding 50c is connected to the anode of diode 56 which forms the AND circuit 15.

These connections of the output windings cause a positive pulse to be transferred from the output windings 50a or 50b to the AND circuit 13 whenever either of the stages A or B is shifted from the "1" to the "0" state. Similarly, a positive pulse will be transferred from the output winding 50c to the AND circuit 15 whenever stage C is shifted from the "1" to the "0" state.

A positive pulse from the output windings 50a or 50b will pass through the diode 54 only when the D.C. reference voltage of the output windings, which is determined by the connection from the output windings to the collector of transistor 20, is the same as the voltage on the cathode of diode 54. The cathode of the diode 54 is connected through a resistor 57 to the junction of diodes 58 and 59. The diodes 58 and 59 form an OR circuit so that the junction of the cathodes of diodes 58 and 59 will be at 0 v. if either the transistor 19 or the transistor 20 is conducting. If neither the transistor 19 nor the transistor 20 is conducting, the junction of the cathodes of diodes 58 and 59 will be at —6.5 v.

The diodes 54 will pass a positive pulse under two conditions. The first condition occurs when transistor 20 is conducting at the same time that either stage A or stage B is shifted from the "1" to the "0" state. In this case, the cathode of diode 54 will be at approximately 0 v. because of the connection to the junction of the two diodes 58 and 59, and the anode of the diode 54 will be at approximately 0 v. due to the connection through the output windings 50a and 50b to the collector of transistor 20. A positive pulse from either of the output windings will pass through the diode 54 because the D.C. voltage is the same on both sides of the diode. This condition occurs when either of the first two bits of the received code is a "0," i.e., one of the bits of the received code differs from the corresponding bit of the code which the selector is designed to recognize. The second condition occurs when neither transistor 19 not transistor 20 is conducting when storage element A or B is shifted from "1" to the "0" state. In this case, the cathode of the diode 54 is at —6.5 v. due to the connection to the junction of the diodes 58 and 59, and the anode of the diode 54 is at —6.5 v. due to the connection through the output windings to the collector of transistor 20. Both the anode and the cathode of the diode 54 are then at —6.5 v. and a positive pulse will pass through the diode since both sides of the diode are at the same D.C. reference level. This condition occurs only when there has been an error in the transmission of the code; i.e., both the "1" tone input and the "0" tone input are OFF at the same time.

The diode 56 will pass a positive pulse only when the storage element C is shifted from the "1" to "0" state at the same time that both the anode and the cathode of the diode 56 are at the same D.C. potential. The cathode of the diode 56 is connected through the resistor 57 to the junction of the cathodes of the diodes 58 and 59. The anode of the diode 56 is connected through the output winding 50c and resistor 55 to the collector of the transistor 19.

The diode 56 will pass a positive pulse under two conditions. The first condition occurs when transistor 19 is conducting at the same time that stage C is shifted from the "1" to the "0" state. In this case, the cathode of diode 56 is at 0 v. due to the connection to the junction of the diodes 58 and 59. The anode of the diode 56 is also at approximately 0 v. due to the connection to the collector of transistor 19. Since both sides of the diode 56 are at the same D.C. reference level, the positive pulse appearing on the output winding 50c will pass through the diode 56. The second condition occurs when neither transistor 19 nor the transistor 20 is conducting when storage element C is shifted from the "1" to the "0" state. In this case, the cathode of the diode 56 is at —6.5 v. due to the connection of the output winding to the collector of transistor 19. Both the anode and the cathode of the diode 56 are then at —6.5 v. and a positive pulse will pass through the diode since both sides of the diodes are at the same D.C. reference level.

Either diode 54 or diode 56 will also pass a pulse if both transistors 19 and 20 are in the ON condition, the diode that passes the pulse depending upon which stage is shifted from the "1" to the "0" state at that time. In this case, the reference voltages on both sides of the diodes are at the same level and a positive pulse will pass through the diodes.

While the tone error logic circuitry 16 has been shown as a separate function in the block diagram FIG. 1, it can be seen from the previous description that this function is actually carried on by the diodes 54 and 56 which also perform the function of determining when one of the bits of the received code differs from the corresponding bit of the code which the selector is designed to recognize. A positive pulse output from diode 54 or diode 56 indicates that there has been an error in the transmission of the received code, that is, that both the "1" tone input and the "0" tone input are ON at the same time or OFF at the same time, or that there has been a difference between one bit of the received code and the corresponding bit of the code which the selector is designed to recognize. The cathodes of diodes 54 and 56 are connected through the capacitor 34 to the clock switch 4. A pulse output from diode 54 or 56 will turn the clock switch 4 off. The trip line 9 is also connected to the clock switch 4 through a capacitor 61 and a diode 65 so as to turn the clock switch OFF when the last stage, D, is shifted from the "1" to the "0" state. The connections from trip line 9 and AND circuits 13 and 15 to the OFF input of clock switch 4 have been indicated in block form as the OR circuit 14 in FIG. 1.

The last bit gate 10 is formed by diode 60 connected in series with a capacitor 74. The cathode of the diode 60 is connected to 0 v. through a resistor 62. The anode of the diode 60 is connected to the output winding *50d* of the last stage. The D.C. reference of the anode of the diode 60 is determined by a connection from the output winding *50d* to the collector of the transistor 19 through the resistor 55. When the collector of transistor 19 is at approximately 0 v., the diode 60 will pass a positive pulse from the output winding *50d* to the base of a transistor 63. A pulse from the last bit gate to the base of the transistor 63 will turn the alarm switch, comprising the transistors 63 and 64 and associated circuitry, ON. The last bit gate is necessary to prevent actuation of the alarm if the last bit of the received code is not correct. The connection from the anode of the diode 60 to the appropriate D.C. reference level is determined by the last bit of the code. Since the last bit of the code which the subject selector has been designed to recognize is a "1," the anode of diode 60 is connected, through the winding *50d*, to the collector of the transistor 19.

When a positive pulse is transferred to the base of the transistor 63, the transistor 63 will conduct and the alarm switch will be turned ON. The operation of the alarm switch is similar to the operation of the clock switch 4 which has been already described. When the alarm switch is turned ON, any suitable indicator which may be connected between ground and the collector of transistor 63 will be actuated.

When the clock switch 4 is turned OFF, the clear circuit 17 is enabled to set all stages of the ring counter back to the "0" position. The clear circuit 17 is formed by a transistor 70 and associated circuitry. The collector or transistor 27 is connected to the base of transistor 70 through a capacitor 71. When the clock switch 4 is turned OFF, the negative voltage on the collector of the transistor 27 will cause decoupling of the circuit of transistor 70, hence, capacitor 71, will discharge through resistor 100, turning on transistor 70. When the transistor 70 is turned ON, current will flow from the transistor 70 through the advance windings of the ring counter so as to set all stages of the ring counter back to the "0" position.

The noise cancellation circuit 18 consists of a capacitor 66 and a diode 67 connected in series between the series-connected regenerative windings and the output windings. This noise cancellation circuit couples the noise on the regenerative windings to the output windings through capacitors 68 and 69 with a polarity such that the noise on the output windings is cancelled. The operation of this noise cancellation circuit is described more fully in the aforementioned application of R. F. Suits and R. P. Gifford, Serial No. 762,440, filed September 22, 1958.

The operation of the selector in recognizing the code 1101 can now be described. When the correct start bit is received, the start logic 3 will produce an output to turn ON the clock switch 4. When the clock switch 4 is turned ON, the set circuit 5 is enabled to set the first stage A, of the ring counter to the "1" position. The clock switch 4 also enables the clock 7 and advance driver 8 to feed clock pulses to the ring counter 6. These clock pulses drive the binary "1" to successive stages of the ring counter 6.

When the binary "1" is driven from stage A to stage B, an output pulse from the output winding of stage A is connected to the AND circuit 13. Since the other input to the AND circuit 13, the connection from detector 2, is in the OFF or approximately −6.5 v. condition corresponding to the "1" in the first bit of the code 1101, the pulse from the output winding of stage A will not pass through the AND circuit 13. The second clock pulse will drive the "1" from stage B to stage C and produce an output pulse on the output winding of stage B which is connected to the AND circuit 13. This output pulse will not pass through AND circuit 13 because the other input to the AND circuit 13 is still in the −6.5 v. condition corresponding to the second "1" in the code 1101. The third clock pulse will drive the binary "1" from stage C to stage D of the ring counter and produce an output pulse on the output winding of stage C which is connected to AND circuit 15. The positive pulse will not pass the AND circuit 15 because the other input to AND circuit 15, the connection from the detector 1 to the AND circuit 15, is in the OFF or −6.5 v. condition corresponding to the binary "0" in the code 1101. The fourth clock pulse will drive stage D from the "1" to the "0" condition and produce an output pulse which is transferred by the trip line 9 to the last bit gate 10. This pulse will pass the last bit gate 10 since the other input to the last bit gate, the connection from the linear detector 1, is at approximately "0" v. corresponding to the last bit, "1," of the binary code 1101. The pulse from trip line 9 will pass through the last bit gate 10 to actuate the alarm 11 and indicate that the proper code has been received. The pulse from the output winding of the last stage will also be transferred through the OR circuit 14 to the OFF input of the clock switch 4. The clock 7 will be turned OFF. The stages of the ring counter 6 are all in the "0" position and the selector is in a condition to receive the next binary code.

Note that if any bit of the received code differs from the binary code 1101, a pulse will pass through either the AND gate 13 or the AND gate 15. This pulse will pass through the OR circuit 14 to the OFF input of the clock switch 4. The OFF condition of the clock switch 4 will enable the clear circuit 17 to set all stages of the ring counter to the "0" position. Also, if there is an error in the transmission of the code so that both the "1" tone input and the "0" tone input are ON at the same time or if both the "1" tone input and the "0" tone input are OFF at the same time, the tone error logic circuitry 16 will produce a pulse to turn the clock switch 4 OFF. Again, the clear circuit 17 will be enabled to clear the ring counter of all information. Whenever there is an error in the transmission of the code or whenever one of the received bits differs from the bit which the selector is designed to recognize the clock switch 4 is turned OFF and the ring counter is prevented from completing its cycle and actuating the alarm 11.

The novel features believed descriptive of the invention are defined particularly in the appended claims.

What I claim as new and desire to secure by Letters Patent of the United States is:

1. A code selector of the type used in a selective calling system in which an alarm is actuated at a particular receiver in response to a particular two-tone code made up of a plurality of binary bits, initiation of actuation of said selector occurring in response to a given condition, comprising a ring counter, said ring counter comprising a plurality of stages, each stage corresponding to one bit of the received code, clock circuitry for driving said ring counter through its cycle in response to the first received bit of the code, means for comparing each bit of the received code with the output of the corresponding ring counter stage to determine if that bit is the same as the corresponding bit of the code which the selector is designed to recognize, tone error logic circuitry for determining whether there has been an error in the transmission of the received code due to the presence of a condition other than said given condition, means responsive to an error in the transmission of the code and responsive to the determination of a difference between one of the received bits and the corresponding bit of the code which the selector is designed to recognize for preventing said ring counter from being driven through a complete cycle, an alarm connected to the last stage of said ring counter, and means for actuating said alarm only when said ring counter has been driven through one complete cycle.

2. A code selector of the type used in a selective calling system in which an alarm is actuated at a particular receiver in response to a particular two-tone code made up of a plurality of binary bits comprising a ring counter, said ring counter comprising a plurality of stages, each stage corresponding to one bit of the received code, clock circuitry for driving said ring counter through its cycle in response to the first received bit of the code, each bit of the received code consisting of the ON or the OFF condition of two tone inputs, means for disabling said clock circuitry from driving said ring counter through a complete cycle whenever one bit of the received code differs from the corresponding bit of the code which the selector is designed to recognize, means for disabling said clock circuitry from driving said ring counter through a complete cycle when both tone inputs are in the ON condition or when both tone inputs are in the OFF condition, an alarm connected to the last stage of said ring counter, and means for actuating said alarm only when said ring counter has been driven through one complete cycle.

3. A code selector of the type used in a selective calling system in which an alarm is actuated at a particular receiver in response to a particular two-tone code consisting of a plurality of binary bits comprising a ring counter, said ring counter containing a plurality of stages, each stage corresponding to one bit of the received code, clock circuitry for driving said ring counter through its cycle, means for enabling said clock circuitry to produce clock pulses to drive said ring counter through its cycle in response to the first bit of the received code, means for setting a binary "1" into the first stage of the ring counter when said clock circuit is enabled, means for comparing each bit of the received code with the output of the corresponding ring counter stage to determine if that bit is the same as the corresponding bit of the code which the selector is designed to recognize, tone error logic circuitry for determining whether there has been an error in the transmission of the received code, means responsive to an error in the transmission of the received code and responsive to the determination of a difference between one of the received bits and the corresponding bit of the code which the selector is designed to recognize for preventing said ring counter from being driven through a complete cycle, means for driving all stages of the ring counter to the binary "0" position when the clock circuitry is disabled, an alarm connected to the last stage of said ring counter, and means for actuating said alarm only when said ring counter has been driven through one complete cycle.

4. A code selector of the type used in a selective calling system in which an alarm is actuated at a particular receiver in respose to a particular two-tone code made up of a plurality of binary bits comprising a ring counter, said ring counter comprising a plurality of stages, each stage corresponding to one bit of the received code, clock circuitry for driving said ring counter through its cycle in response to the first received bit of the code, each bit of the received code consisting of the ON or OFF condition of the "0" tone input and the ON or OFF condition of the "1" tone input, an AND circuit, the outputs of the stages of the ring counter corresponding to the binary "1" bits in the code which the selector is designed to recognize being connected in series, said series connected outputs being connected to said AND circuit, the "0" tone input being connected to said AND circuit, said AND circuit producing an output when one of the stages whose output is connected to said AND circuit is shifted from the "1" to the "0" state at the same time the "0" tone input is ON, an OR circuit, the output of said AND circuit being connected to said OR circuit, a second AND circuit, the outputs of the stages of the ring counter corresponding to the binary "0" bits in the code which the selector is designed to recognize being connected in series, said series-connected outputs being connected to said second AND circuit, the "1" tone input being connected to said second AND circuit, said second AND circuit producing an output when one of the stages whose output is connected to said second AND circuit is shifted from the "1" to the "0" state at the same time the "1" tone input is ON, the output of said second AND circuit being connected to said OR circuit, the "1" tone input and the "0" tone input being connected to said AND circuits so that one of said AND circuits will produce an output when there is an error in the transmission of the received code, means for disabling said clock circuitry from driving said ring counter through a complete cycle, the output of said OR circuit being connected to said last-named means, an alarm connected to the last stage of said ring counter and means for actuating said alarm only when said ring counter has been driven through a complete cycle.

5. A code selector of the type used in a selective calling system in which an alarm is actuated at a particular receiver in response to a particular two-tone code made up of a plurality of binary bits comprising a ring counter, said ring counter comprising a plurality of stages, each stage corresponding to one bit of the received code, clock circuitry for driving said ring counter through its cycle in response to the first received bit of the code, each bit of the received code consisting of the ON or OFF condition of the "0" tone input and the ON or OFF condition of the "1" tone input, an AND circuit, the outputs of the stages of the ring counter corresponding to the binary "1" bits in the code which the selector is designed to recognize being connected in series, said series-connected outputs being connected to said AND circuit, the "0" tone input being connected to said AND circuit, said AND circuit producing an output when one of the stages whose output is connected to said AND circuit is shifted from the "1" to the "0" state at the same time the "0" tone input is ON, an OR circuit, the output of said AND circuit being connected to an OR circuit, a second AND circuit, the outputs of the stages of the ring counter corresponding to the binary "0" bits in the code which the selector is designed to recognize being connected in series, said series-connected outputs being connected to said second AND circuit, the "1" tone input being connected to said second AND circuit, said second AND circuit producing an output when one of the stages whose output is connected to said second AND circuit is shifted from the "1" to the "0" state at the same time the "1" tone input is ON, the output of said second AND circuit being connected to said OR circuit, the "1" tone input and the "0" tone input being connected to said AND circuits so that one of said AND circuits will produce an output when there is an error in the transmission of the received code, the output of of said OR circuit being connected to means for disabling said clock circuitry from driving said ring counter through a complete cycle, a last bit gate, the output of the last stage of the ring counter being connected to said last bit gate, one of the tone inputs being connected to said last bit gate so that the last bit gate will produce an output only when the last bit of the received code corresponds to the last bit of the code which the selector is designed to recognize, and an alarm, the output of said last bit gate being connected to said alarm so as to actuate said alarm when the code which the selector has been designed to recognize has been received.

6. A code selector of the type used in a selective calling system in which an alarm is actuated at a particular receiver in response to a particular two-tone code made up of a plurality of binary bits comprising a ring counter, said ring counter comprising a plurality of stages, each stage corresponding to one bit of the received code, clock circuitry for driving said ring counter through its cycle in response to the first received bit of the code, means for comparing each bit of the received code with the output of the corresponding ring counter stage to determine if that bit is the same as the corresponding bit of the code which the selector is designed to recognize, tone error logic circuitry for determining whether there has been an error in the transmission of the received code, means responsive to an error in the transmission of the received code and responsive to the determination of a difference between one of the received bits and the corresponding bit of the code which the selector is designed to recognize for preventing said ring counter from being driven through a complete cycle, a last bit gate, the output of the last stage of the ring counter being connected to said last bit gate, one of the tone inputs being connected to said last bit gate so that the last bit gate will produce an output only when the last bit of the received code corresponds to the last bit of the code which the selector is designed to recognize and an alarm, the output of said last bit gate being connected to said alarm so as to actuate said alarm when the code which the selector has been designed to recognize has been received.

7. A code selector of the type used in a selective calling system in which an alarm is actuated at a particular receiver in response to a particular two-tone code made up of a plurality of binary bits comprising a clock switch, said received two-tone code being connected to said clock switch so as to turn said clock switch ON in response to the first received bit, clock circuitry, said clock switch being connected to said clock circuitry so as to enable said clock circuitry to produce periodic clock pulses, a ring counter, said ring counter containing a plurality of stages, each stage corresponding to one bit of the received code, said clock circuitry being connected to said ring counter for driving said ring counter through its cycle, a set circuit, said clock switch being connected to said set circuit, said set circuit being connected to the first stage of the ring counter so as to set the first stage of said ring counter to the "1" position in response to the ON condition of the clock switch, means for comparing each bit of the received code with the output of the corresponding ring counter stage to determine if that bit is the same as the corresponding bit of the code which the selector is designed to recognize, tone error logic circuitry for determining whether there has been an error in the transmission of the received code, means responsive to an error in the transmission of the received code and responsive to the determination of a difference between one of the received bits and the corresponding bit of the code which the selector is designed to recognize for preventing said ring counter from being driven through a complete cycle, a clear circuit, said clock switch being connected to said clear circuit, said clear circuit being connected to said ring counter so as to drive all stages of the ring counter to the "0" position in response to the OFF condition of the clock switch, an alarm connected to the last stage of said ring counter, and means for actuating said alarm only when said ring counter has been driven through one complete cycle.

8. A code selector of the type used in a selective calling system in which an alarm is actuated at a particular receiver in response to a particular two-tone code made up of a plurality of binary bits comprising a ring counter, said ring counter comprising a plurality of stages, each stage corresponding to one bit of the received code, clock circuitry for driving said ring counter through its cycle in response to the first received bit of the code, each bit of the received code consisting of the ON or OFF condition of the "0" tone input and the ON or OFF condition of the "1" tone input, gating circuitry, the outputs of the ring counter stages being connected to said gating circuitry, the "1" tone input and the "0" tone input being connected to said gating circuitry so that said gating circuitry will produce an output when one of the bits of the received code differs from the corresponding bit of the code which the selector is designed to recognize or when there is an error in the transmission of the received code, the output of said gating circuitry being connected to means for disabling said clock circuitry to prevent the ring counter from being driven through a complete cycle, an alarm, the last stage of said ring counter being connected to said alarm, and means for actuating said alarm only when said ring counter has been driven through a complete cycle.

9. A code selector of the type used in a selective calling system in which an alarm is actuated at a particular receiver in response to a particular two-tone code made up of a plurality of binary bits comprising, start logic, said received code being supplied to said start logic, said start logic producing an output when the correct start bit is received, a clock switch, each bit of the received code consisting of the ON or OFF condition of the "0" tone input and the ON or OFF condition of the "1" tone input, the output of said start logic being connected to said clock switch, a set circuit, said clock switch being connected to said set circuit, a ring counter, said ring counter comprising a plurality of stages, each stage corresponding to one bit of the received code, said set circuit being connected to the first stage of said ring counter, said set circuit driving the first stage of said ring counter to the "1" position in response to the ON condition of the clock switch, clock circuitry, the clock switch being connected to said clock circuitry, said clock circuitry being connected to said ring counter, said clock circuitry producing periodic clock pulses in response to the ON condition of said clock switch for driving the "1" in the first stage of said ring counter to succeeding stages of the ring counter, an AND circuit, the outputs of the stages of the ring counter corresponding to the binary "1" bits in the code which the selector is designed to recognize being connected in series, said series connected outputs being connected to said AND circuit, the "0" tone input being connected to said AND circuit, said AND circuit producing an output when one of the stages whose output is connected to said AND circuit is shifted from the "1" to the "0" state at the same time the "0" tone input is ON, an OR circuit, the output of said AND circuit being connected to said OR circuit, a second AND circuit, the outputs of the stages of the ring counter corresponding to the binary "0" bits in the code which the selector is designed to recognize being connected in series, said series connected outputs being connected to said second AND circuit, the "1" tone input being connected to said second AND circuit, said second AND circuit producing an output when one of the stages whose output is connected to said second AND circuit is shifted from the "1" to the "0" state at the same time the "1" tone input is ON, the output of said second AND circuit being connected to said OR circuit, a second OR circuit, the "1" tone input being connected to said second OR circuit, the "0" tone input being connected to said second OR circuit, the output of said second OR circuit being connected to both of said AND circuits so that one of said AND circuits will produce an output when both the "1" tone input and the "0" tone input are in the ON condition or when both the "1" tone input and the "0" tone input are in the OFF condition, the output of said first OR circuit being connected to said clock switch so as to turn said clock switch OFF when there is a difference between one of the bits of the received code and the corresponding bit of the code which the selector is designed to recognize or when there has been an error in the transmission of the code, a last bit gate, the output of the last stage of the ring counter being connected to said last bit gate, one of the tone inputs being connected to said last bit gate so that the last bit gate will produce an output only when the last bit of the received code corresponds to the last bit of the code which the selector is designed to recognize, and an alarm, the output of said last bit gate being connected to said alarm so as to actuate said alarm when the code which the selector has been designed to recognize has been received, the output of said last bit gate being connected to said first OR circuit so as to turn said clock switch OFF when said alarm has been actuated, a clear circuit, said clock switch being connected to said clear circuit, said clear circuit being connected to said ring counter so as to set all stages of said ring counter to the "0" position in response to the OFF condition of said clock switch.

References Cited in the file of this patent

UNITED STATES PATENTS

| | | |
|---|---|---|
| 2,446,943 | McGoffin | Aug. 10, 1948 |
| 2,514,889 | McGoffin | July 11, 1950 |
| 2,558,888 | Trimble | July 3, 1951 |
| 2,707,209 | Ambrosio | Apr. 26, 1955 |
| 2,812,509 | Phelps | Nov. 5, 1957 |
| 2,924,755 | Carter | Feb. 9, 1960 |
| 3,001,176 | Ingham | Sept. 19, 1961 |